Aug. 12, 1958 J. M. COSENTINO 2,847,229
SHOCK ABSORBING SYSTEM FOR VEHICLES
Filed Nov. 23, 1955 3 Sheets-Sheet 2
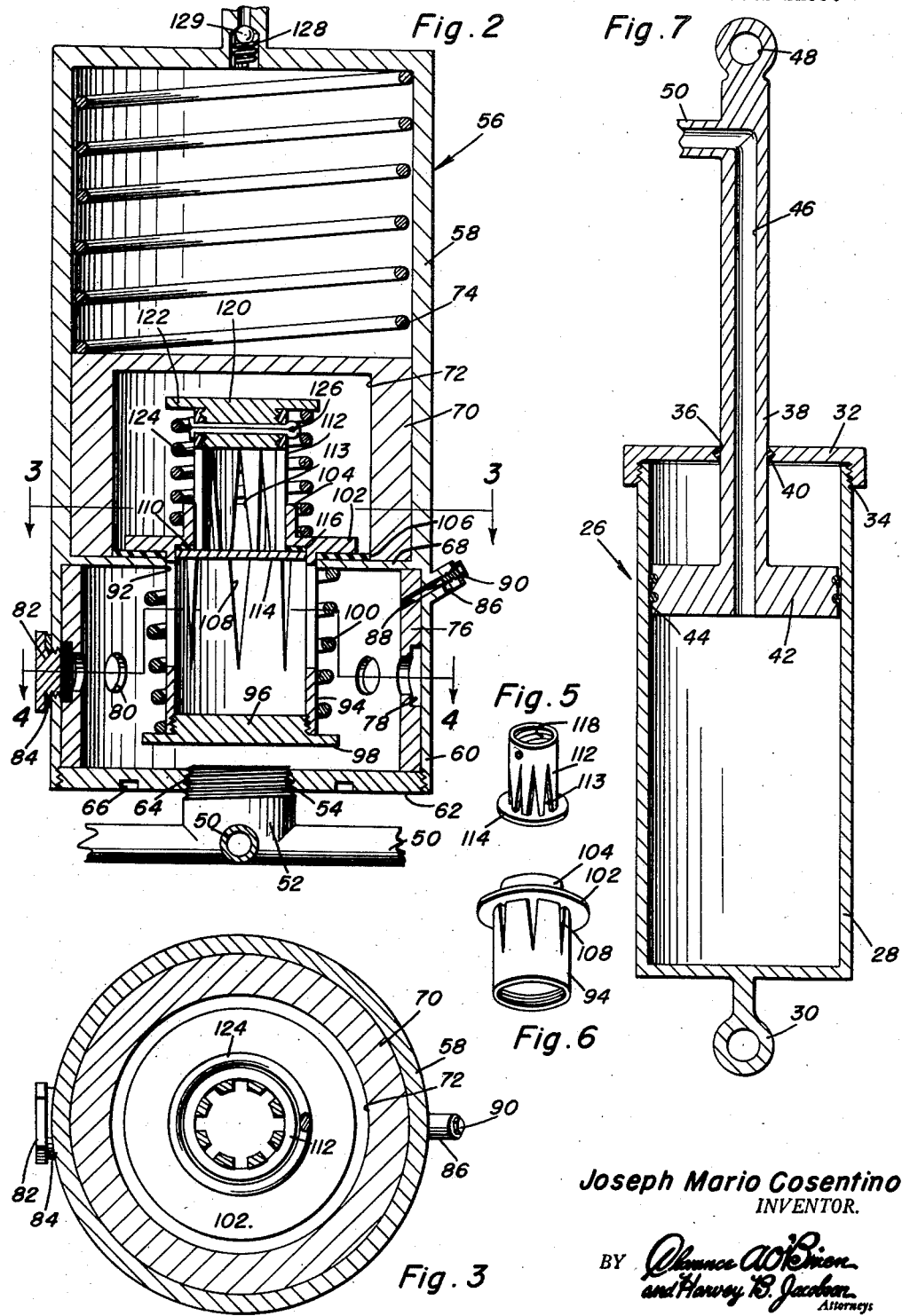
Joseph Mario Cosentino
INVENTOR.

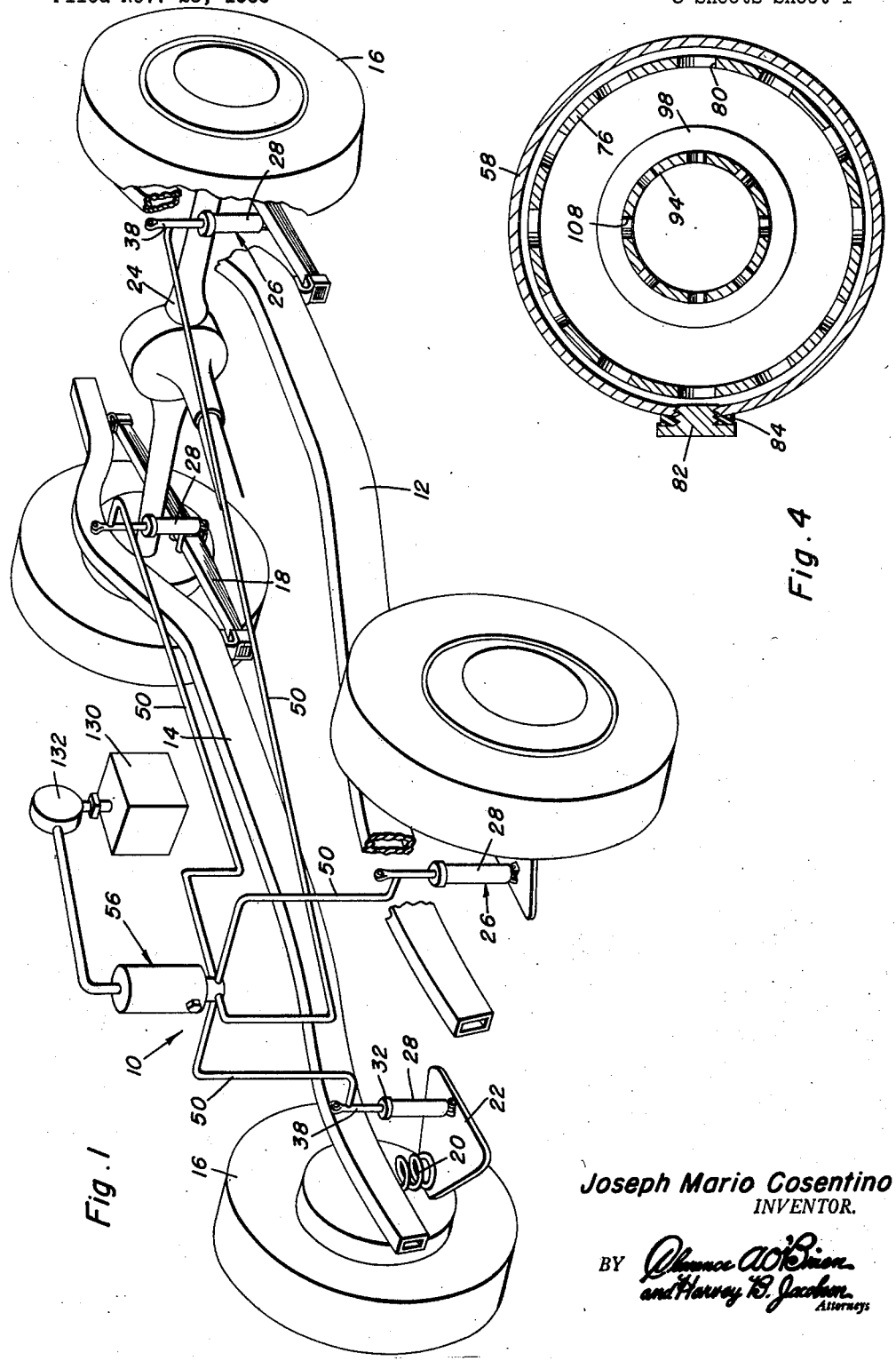
Aug. 12, 1958     J. M. COSENTINO     2,847,229
SHOCK ABSORBING SYSTEM FOR VEHICLES
Filed Nov. 23, 1955     3 Sheets-Sheet 1
Joseph Mario Cosentino
*INVENTOR.*

Aug. 12, 1958   J. M. COSENTINO   2,847,229
SHOCK ABSORBING SYSTEM FOR VEHICLES
Filed Nov. 23, 1955   3 Sheets-Sheet 3
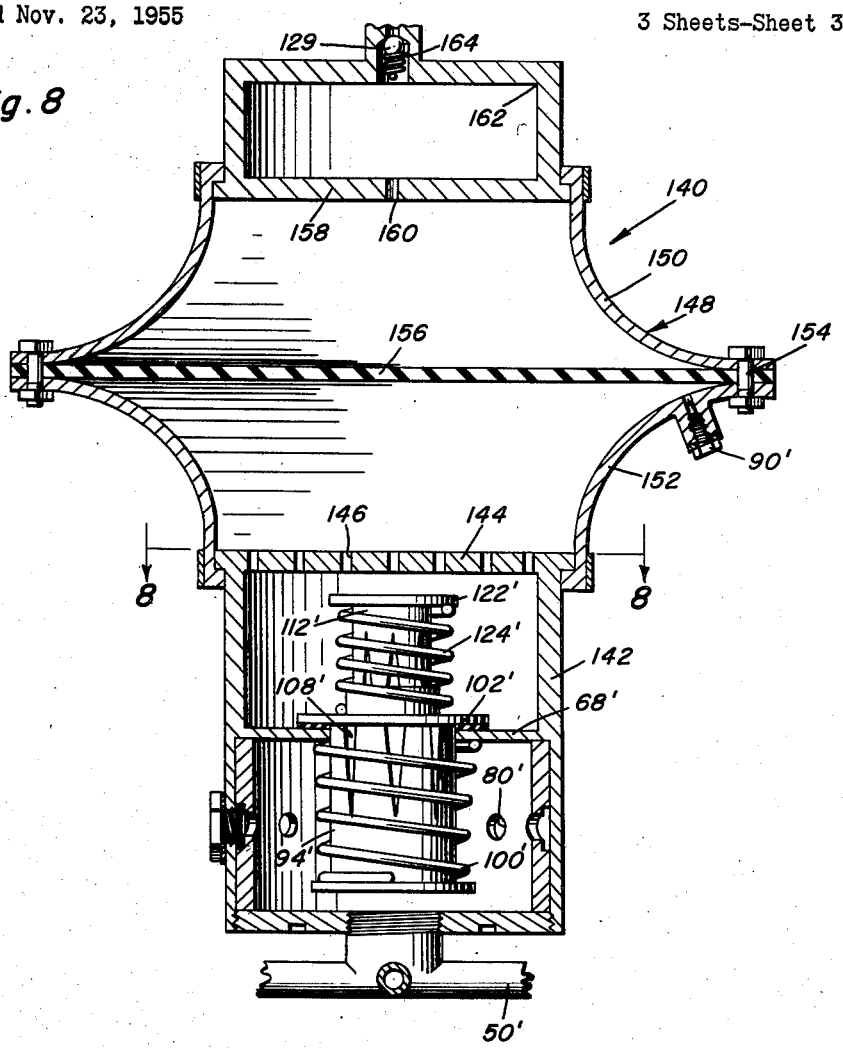
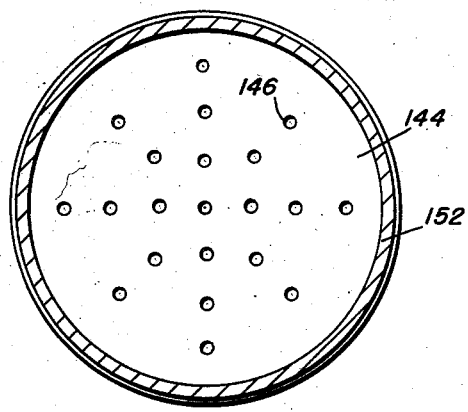
Joseph Mario Cosentino
INVENTOR.

2,847,229
SHOCK ABSORBING SYSTEM FOR VEHICLES

Joseph Mario Cosentino, Baltimore, Md.

Application November 23, 1955, Serial No. 548,666

5 Claims. (Cl. 280—104)

This invention generally relates to a shock absorbing system for vehicles, and more specifically provides an improvement over the system illustrated in my previous patent, No. 2,452,105, issued October 26, 1948.

An object of the present invention is to provide an improved shock absorbing system for vehicles including a hydraulic cylinder and piston mechanism supported between the opposite ends of the front and rear axles and the vehicle chassis whereby road shocks and impact will be taken up by said hydraulic shock absorbing means and whereby the shock absorbers are interconnected with a master cylinder wherein an equal pressure will be exerted on all of the shock absorbing cylinder and piston mechanisms.

Another object of the present invention is to provide an improved shock absorbing system for vehicles including a master cylinder having a free floating piston slidable therein which is subject to fluid pressure on one side connected to a suitable supply and connected with a set of four hydraulic shock absorbers arranged at the opposite ends of the forward and rear axles whereby any of the shock absorbers that are actuated to move the pistons contained therein will cause a corresponding flow of hydraulic fluid into the master cylinder below the piston therein to compress the fluid trapped behind the piston wherein the fluid flow into the master cylinder will be automatically throttled or reduced in direct proportion to the opening of the inlet valve in the master cylinder.

A further object of the present invention is to provide a shock absorbing system for vehicles comprising a master cylinder and interconnected hydraulic shock absorbing cylinders in which the piston rods are tubular and permit passage of fluid from the shock absorbing cylinders to the master cylinder for eliminating flexible hoses and the like.

Still another important object of the present invention is to provide a shock absorbing system for vehicles including a plurality of hydraulic shock absorbing piston and cylinder mechanisms interconnected with a master cylinder wherein the master cylinder is provided with a free floating piston together with a compressible fluid on one side thereof wherein movement in one of the shock absorbing piston and cylinder mechanisms will be transmitted to the master cylinder for distribution to all of the shock absorbing mechanisms for equalizing the movement and dampening the shock caused by movement of the vehicle wheels such as occurs when running over uneven roads or the like.

Still another important feature of the present invention is to provide a shock absorbing system in accordance with the preceding objects in which the master cylinder may be in the form of a diaphragm device and in which the shock absorbing characteristics of the device may be varied.

Other objects of the present invention will reside in its simplicity of construction, ease of operation, ease of repair, ease of installation on existing vehicles, its adaptation for its particular purposes and its relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the shock absorbing system of the present invention;

Figure 2 is a longitudinal, vertical sectional view taken substantially upon a plane passing through the longitudinal center line of the master cylinder of the shock absorbing system;

Figure 3 is a plan sectional view taken substantially upon a plane passing along section line 3—3 of Figure 2 illustrating the details of construction thereof;

Figure 4 is a plan sectional view taken substantially upon a plane passing along section line 4—4 of Figure 2 illustrating further structural details of the master cylinder;

Figure 5 is a detail perspective view illustrating the frusto-conical valve members;

Figure 6 is a detail perspective view illustrating the construction of the tubular valve members;

Figure 7 is a longitudinal, vertical sectional view taken substantially upon a longitudinal plane passing through the center of one of the hydraulic shock absorbing piston and cylinder mechanisms of the present invention;

Figure 8 is a sectional view similar to Figure 2 illustrating a modified form of the invention; and Figure 9 is a sectional view taken substantially upon a plane passing along section line 8—8 of Figure 8 illustrating the apertured plate construction.

Referring now specifically to the drawings, it will be seen that the numeral 10 generally designates the shock absorbing system for vehicles of the present invention wherein there is provided a vehicle chassis including longitudinally extending spaced frame members 12 and 14 that are supported by ground engaging wheels 16 together with rear springs 18, front springs 20 and front A-frame members 22. The usual rear axle housing 24 interconnects the rear wheels 16 and the front wheels 16 are steerable in the usual manner. Interconnecting each of the A-frames 22 and an adjacent portion of the longitudinal rails 12 and 14 is a hydraulic shock absorbing piston and cylinder mechanism generally designated by the numeral 26 and interconnecting the springs 18 and each longitudinal frame member 12 and 14 adjacent the rear end thereof is also a similar hydraulic shock absorbing piston and cylinder mechanism 26, all of which are identical in construction and specifically illustrated in Figure 7.

Referring now specifically to Figure 7, it will be seen that each of the hydraulic piston and cylinder shock absorbing mechanisms 26 includes a cylinder 28 having a mounting bracket 30 depending from the lower end thereof for attachment to either the A-frame 22 or the spring members 18. The upper end of the cylinder 28 is provided with a removable closure cap 32 that is screw threadedly connected to the cylinder 28 by screw threads 34. The center of the closure cap 32 is provided with an opening 36 for slidably receiving a tubular piston rod 38 and a seal member 40 is provided for sealing the piston rod 38 within the opening 36. The inner end of the piston rod 38 is provided with an integral piston member 42 slidable in the cylinder 28, and the piston 42 is provided with piston seal rings 44 for sealing the piston 42 to the inner surface of the cylinders 28. The piston rod 38 is tubular and provided with a longitudinal passage 46 together with an eye member 48 for attachment to the longitudinal frame rails 12 or 14. The passage 46 is connected to conduits 50 and fluid within the cylinder 28 and under the pistons 42 will proceed through the passageway 46 when the cylinder 28 is moved upwardly in response to upward movement of the supporting wheels 16.

As stated, each of the hydraulic piston and cylinder shock absorbing mechanisms 26 is provided with a discharge pipe or conduit 50 which are interconnected by an adapter 52 having a screw threaded portion 54 for screw threaded engagement with a master cylinder 56 described hereinafter.

Referring now specifically to Figure 2 of the drawings, the master cylinder 56 includes generally an elongated cylindrical member 58 disposed in vertical relation that is provided with a thinned lower portion 60 provided with a screw threaded closure plug 62. The screw threaded closure plug 62 is provided with a threaded aperture 64 extending therethrough for receiving the threaded portion 54 of the adapter 52 thereby communicating the conduits 50 with the interior of the cylinder 58. The outer surface of the closure plug 62 is also provided with recesses 66 for receiving a tool for removing the closure plug 62.

Disposed between the junction of the cylinder 58 and the lower portion 60 thereof is an inwardly extending flange 68 forming a seat for a free floating piston 70 having an enlarged recess 72 in the center thereof. The piston 70 engages the upper surface of the flange 68 and a compression coil spring 74 is disposed between the piston 70 and the head or closed end of the cylinder 58 for retaining the piston 70 in engagement with the upper surface of the inwardly extending flange 68.

Disposed below the flange 68 and in engagement therewith is an annular sleeve member 76 which abuts the undersurface of the flange 68 at one end and abuts the inner surface of the closure plug 62 at the other end thereof, thereby locating and positioning the sleeve 76 within the lower portion 60 of the cylinder 58. The sleeve 76 is provided with an annular recess 78 on its outer surface generally at its longitudinal center, together with a plurality of apertures 80 extending through the sleeve 76 for communicating the recess 78 with the interior of the sleeve 76.

A screw threaded plug 82 is provided in the thinned portion 60 of the cylinder 58 together with a suitable seal 84 wherein the conduits 50 may be attached to the opening receiving the plug 82 in certain installations wherein the bottom of the cylinder 58 is not available. Also, the plug 82 may be utilized for drainage of or refilling of the master cylinder and the entire system with fluid.

Disposed oppositely of the plug 82 is an upwardly angularly extending boss 86 having a passage 88 therein which extends through the sleeve 76 together with a closure screw threaded member 90 for forming a closure for the passage 88 thereby permitting bleeding or drainage of the hydraulic shock absorbing system. The fluid pressure from the shock absorbing piston and cylinder mechanisms 26 will be discharged within the lower end of the cylinder 58 through the pipes 50 for a purpose described hereinafter.

The inwardly extending flange 68 is provided with a central opening 92 slidably receiving a tubular valve 94 which has a closure plug 96 at its lower end with a peripherally extending flange 98 for abutting one end of a compression coil spring 100 which has the other end thereof abutting the undersurface of the flange 68. The upper end of the tubular valve 94 is provided with a peripherally extending plate 102 together with an upstanding tubular projection 104. Positioned under the tubular plate 102 is a seal gasket 106 of rubber-like material which is disposed on the upper surface of the flange 68 wherein the plate 102 will engage the same, thereby closing the opening 92. The tubular member 94 is provided with a plurality of peripherally spaced tapering slots 108 which permit passage of fluid into the interior of the tubular valve 94 and it will be noted that the slots 108 are disposed with the largest area normally positioned adjacent the flange 68.

It will be noted that the juncture between the plate 102 and the upstanding cylindrical extension 104 forms a valve seat 110 for slidably receiving a valve member 112 that is cylindrical and slotted at 113, and is provided at its lower end with a valve plate 114 having a gasket member 116 thereon for engaging the undersurface of the valve seat 110 thereby forming a closure therefor. The upper end of the valve member 112 is provided with a threaded socket 118 for threadedly receiving a projecting stud 120 on a plate member 122 which abuts one end of a compression coil spring 124 which abuts the upper surface of the plate 102 at its other end for normally urging the valve plate 114 and the gasket 116 into contact with the valve seat 110 thereby closing the opening through the tubular valve 94. The threaded stud 120 is retained within the socket 118 by use of a suitable cotter pin 126, thereby retaining the device in assembled relation. It is noted that the tapered slots 113 in the valve member 112 will reduce the flow of fluid through the tubular valve member 94 as the valve member 112 moves downwardly to an open position. Also, it is noted that the tapered slots 108 will reduce the flow of fluid upwardly through the tubular sleeve valve 94 as the valve 94 moves upwardly and the plate 102 leaves the upper surface of the flange 68.

The upper end of the cylinder 58 is provided with an interconnecting pipe 128 that is connected to a pressure tank 130 through a suitable pressure gauge 132 wherein air pressure may be provided within the cylinder 58 above the free floating piston 70. It will be understood that the pressure may be adjusted as determined, and a suitable air reduction pressure valve may be provided or a suitable air pressure source may be provided for varying the pressure above the piston 70, thereby varying the shock absorbing characteristics of the system of the present invention.

During practical use of the present system, the entire system is filled with a fluid, and upon movement of one of the cylinders 28, a corresponding quantity of fluid will be discharged into the lower portion 60 of the cylinder 58. As the pressure in this area rises, the fluid will proceed through the slots 108 and engage the undersurface of the valve plate 114, thereby raising the plate 102 from the flange 68 by compressing spring 100. As the tubular valve 94 raises to an open position, fluid will flow into the recess 72 of the piston 70 for moving the piston 70 towards the closed end of the cylinder 58. The tapered relation of the slots 108 will meter or reduce the flow of fluid into the recess 72 of the piston 70. When the pressure has been equalized in the lower portion 60 and behind the piston 70, movement of the piston 70 will stop and flow of fluid will stop. It will be seen that this maintains a constant pressure in all of the conduits 50 and all of the cylinders 28, thereby equalizing the movement of all portions of the frame rails 12 and 14. Correspondingly, downward movement of the cylinder 28 will reduce the pressure in lower portion 60 of the cylinder 58, thereby causing fluid within the recess 72 and under the piston 70 to flow through the tubular extension 104 due to spring 74 and the force of compressed air above piston 70 thereby urging the valve 114 to an open position for increasing the pressure within the conduits 50, and equalizing pressure in portion 60 and under piston 70 thereby retaining a constant pressure in the hydraulic shock absorbing cylinder and piston mechanisms 26 for assuring an even and shock-free ride.

Referring now specifically to Figures 8 and 9 of the drawings, the numeral 140 generally designates a modified form of the present invention wherein the major portion of the device is similar to that illustrated in Figure 2. In line with this, a cylindrical housing 142 is provided which includes a valving arrangement that is identical to the valving arrangement illustrated in Figure 2, and these parts are designated by the same numerals which are primed for clarity.

The upper end of the casing or housing 142 is provided with a plate 144 provided with a series of apertures 146 therein which permit discharge of fluid from the casing 142 upwardly into a diaphragm casing 148 which is of two-piece construction and includes an upper half 150 and a lower half 152 which are outwardly flared with the outer edges thereof joined together by a series of circumferentially spaced fastening bolts 154. Disposed between the outer edges of the upper and lower portions 150 and 152 of the casing 148 and forming a dividing member is a flexible diaphragm 156 which is substantially equivalent to the free floating piston 70 in the construction of Figure 2.

A closure plate 158 is provided in the upper end of the housing 148 wherein the closure plate 158 is provided with an aperture 160 which acts as a metering orifice which retards the flow of fluid into and from the interior of the upper half 150 of the casing 148. The orifice 160 leads into a chamber 162 that is provided with an outlet 164 which is equivalent to the outlet 128 in the construction of Figure 2 wherein the outlet 164 is connected to the pressure tank and pressure gauge 132, as illustrated in Figure 1, and not specifically illustrated in Figures 8 and 9.

The operation of the form of the invention illustrated in Figures 8 and 9 is substantially identical to that illustrated in Figures 1–7, wherein the differential in pressure between the various cylinders adjacent the wheels will be equalized, and the diaphragm 156 will act substantially in the same manner as the free floating piston 70. With this explanation and the detailed explanation in conjunction with the construction of Figure 2, it is believed that the operation of the device will be apparent.

Each form of the device may be provided with a spring urged check valve 129 disposed in air lines 28 and 164 for preventing excessive pressure from entering the pressure tank 130 whereby no high pressures are encountered exteriorly of the master cylinder 56 or 140. If it is desired to reduce the pressure above piston 70 or diaphragm 156, a suitable bleed valve may be provided for exhausting air pressure for varying the stiffness characteristics of the suspension system of a vehicle.

It further will be understood that the suspension system illustrated in the drawings may be employed with the suspension springs omitted from the vehicle. This may be accomplished by providing suitable guide mechanisms for providing lateral stability to the vehicle body and to prevent lateral shifting thereof in relation to the movable frame.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a vehicle body movably mounted on a mobile frame for limited vertical movement in relation thereto, a shock absorbing system comprising a plurality of fluid shock absorbers disposed between the body and frame, a fluid conduit connected to each shock absorber, an expansion device, said conduits being connected to said expansion device for permitting fluid flow for equalizing the fluid pressure in each of the shock absorbers, said expansion device including a hollow housing, a diaphragm mounted centrally in said housing and dividing the housing into two compartments, one of said compartments communicating with said conduits whereby the diaphragm will be forced towards the other compartment, means for retaining a variable pressure in said other compartment for equilizing the fluid pressure on both sides of the diaphragm and equalizing the fluid pressure in the shock absorbers, said compartments having closure plates therein, said plates having openings for throttling the flow of fluid in relation to the compartment.

2. In a shock absorbing system for vehicles having a frame and a plurality of ground engaging wheels movably mounted thereon by support assemblies, the combination of a plurality of fluid shock absorbers interconnecting the frame and wheel support assemblies for absorbing vertical movement of the wheels in relation to the frame, an expansion device mounted on the frame, and conduit means connected to each of said shock absorbers and said expansion device, said expansion device comprising a cylinder having one end communicated with said conduit means, a movable partition disposed in said cylinder for dividing the same into first and second compartments, means communicating the first compartment with the conduit means, energy storing means in the second compartment whereby movement of the partition is responsive to pressure differentials between the compartments for equalizing the pressure in both compartments, and means communicating the first compartment with the conduit means including a spring urged check valve for throttling fluid flow to and from the first compartment, said check valve including a hollow movable spindle having tapering slots for reducing the flow in response to the degree of opening of the valve for throttling the flow of fluid in either direction and maintaining a substantially constant pressure in the shock absorbers.

3. The combination of claim 2 wherein said partition is in the form of a diaphragm sealed to the periphery of a cylinder.

4. The combination of claim 2 wherein said partition includes a free floating piston slidably disposed in the cylinder, and spring means urging the piston towards the check valve.

5. In a shock absorbing system for vehicles having a frame and a plurality of ground engaging wheels movably mounted thereon by support assemblies, the combination of a plurality of fluid shock absorbers interconnecting the frame and wheel support assemblies for absorbing vertical movement of the wheels in relation to the frame, an expansion device mounted on the frame, and conduit means connected to each of said shock absorbers and said expansion device, said expansion device comprising a cylinder having one end communicated with said conduit means, a movable partition disposed in said cylinder for dividing the same into first and second compartments, means communicating the first compartment with the conduit means, energy storing means in the second compartment whereby movement of the partition is responsive to pressure differentials between the compartments for equalizing the pressure in both compartments, and means communicating the first compartment with the conduit means including a spring urged check valve for throttling fluid flow to and from the first compartment, said check valve including a hollow cylindrical valve slidable in an opening in the bottom of the cylinder, said valve having a closed lower end and an open upper end, the upper end of the valve having an inwardly and outwardly extending peripheral flange, spring means urging the outwardly extending flange into sealing engagement with the periphery of the opening in the cylinder, said valve having tapering slots disposed longitudinally therein with the largest area being disposed adjacent the upper end of the valve, a hollow cylindrical valve member disposed coaxially with the valve and slidable in an opening in the upper end of the valve formed by the inwardly extending flange, a closure plate on the lower end of the valve member with the closure plate extending peripherally beyond the valve member for sealing engagement with the inner surface of the inwardly extending flange, spring means urging the flange on the lower end of the valve into engagement with the flange defining the opening in the upper end of the valve, the upper end of the valve member being closed, said valve member having a plurality of tapering slots therein with the largest area thereof being disposed adjacent the closure plate at the lower end of the valve member, said slots in the valve and valve permitting action of fluid pressure on the closure plate on the valve member in either direction for moving the valve and valve member upwardly as a unit for opening the opening in the cylinder or moving the valve member into the valve for opening the opening in the upper end of the valve.

References Cited in the file of this patent

UNITED STATES PATENTS

| | | |
|---|---|---|
| 2,031,000 | Mercier | Feb. 18, 1936 |
| 2,249,402 | Stefano | July 15, 1941 |
| 2,452,105 | Cosentino | Oct. 26, 1948 |
| 2,757,376 | Brueder | July 31, 1956 |